(12) United States Patent
Alsadah (10) Patent No.: US 8,863,349 B2
(45) Date of Patent: Oct. 21, 2014

(54) STEERING AND CLEANING MECHANISM FOR REFLECTOR ARRAYS

(75) Inventor: Jihad Hassan Alsadah, Safwa (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 294 days.

(21) Appl. No.: 13/450,143

(22) Filed: Apr. 18, 2012

(65) Prior Publication Data

US 2013/0276831 A1 Oct. 24, 2013

(51) Int. Cl.
*H01L 31/042* (2014.01)
*F24J 2/46* (2006.01)

(52) U.S. Cl.
USPC ............. 15/246; 52/173.3; 126/569; 126/903

(58) Field of Classification Search
CPC .......... A47L 11/38; F24J 2/461; H01L 31/042
USPC ...................... 15/246; 126/569, 903; 52/173.3
See application file for complete search history.

(56) References Cited

U.S. PATENT DOCUMENTS

| | | | |
|---|---|---|---|
| 3,009,391 A | 11/1961 | Zagieboylo et al. | |
| 4,424,802 A | 1/1984 | Winders | |
| 6,959,993 B2 | 11/2005 | Gross et al. | |
| 8,459,276 B2 * | 6/2013 | Stevens et al. | 134/60 |
| 2010/0224181 A1 | 9/2010 | Chen et al. | |
| 2011/0139184 A1 | 6/2011 | Cherukupalli | |

FOREIGN PATENT DOCUMENTS

| | | | |
|---|---|---|---|
| DE | 102010006531 | * | 8/2011 |
| DE | 102010014790 | * | 10/2011 |
| EP | 2153914 | * | 2/2010 |
| JP | 2004-186632 | * | 7/2004 |
| KR | 101038243 B1 | | 5/2011 |
| WO | WO 2009/061046 A1 | | 5/2009 |

* cited by examiner

*Primary Examiner* — Mark Spisich
(74) *Attorney, Agent, or Firm* — Richard C Litman (57) ABSTRACT

The steering and cleaning mechanism for reflector arrays includes at least one fixed rail and a movable rail slidably movable along the at least one fixed rail. The at least one fixed rail is disposed adjacent a plurality of reflectors arranged in an array. A positioning/cleaning carriage is disposed on the movable rail and slidably movable thereon. The positioning/cleaning carriage includes a positioning module and a cleaning module. The positioning/cleaning carriage is positioned over a select reflector by the combined movement of the movable rail and the carriage along the movable rail. Once positioned, the positioning module and the cleaning module are selectively actuated to both orient the target reflector in the desired position and to clean the same.

16 Claims, 8 Drawing Sheets

STEERING AND CLEANING MECHANISM FOR REFLECTOR ARRAYS

BACKGROUND OF THE INVENTION

1. Field of the Invention

The present invention relates to solar reflector array maintenance systems, and particularly to a steering and cleaning mechanism for reflector arrays that provides an economical and relatively simple solution for optimum positioning of the reflector arrays and cleaning thereof.

2. Description of the Related Art

Solar energy has long been a viable source of alternative and environmentally friendly energy. Certain regions of the world such as deserts, tropics and even some sub-tropical areas have an abundance of this resource due to their location and climate. However, many do not have the means nor the resources to efficiently harness the solar energy for conversion into electricity, an ubiquitous source of power used in many aspects of one's life and activity.

One solution utilizes solar panels, a photovoltaic system that converts solar radiation directly into electricity. However, most commercial solar panels tend to be inefficient, and the more efficient solar panels tend to be relatively expensive due to the complexity and costs involved in manufacture of the components.

Another solution utilizes the concept of solar thermal energy in which solar energy is harnessed to heat a medium, e.g., air, water, or some other fluid. The heated medium can be used as a source of heat for domestic needs (low temperature) or converted into electricity by driving generator turbines (high temperature). In the case of the latter, a conventional solar thermal power plant typically uses arrays of curved or flat reflector panels that concentrate solar radiation to a pre-defined point or area to heat a medium thereon. Unfortunately, these types of power plants can be costly to build and maintain. Some factors that impact cost and maintenance are the size and availability of the land for installing the arrays, the systems required to adjust the reflector panels for maximizing exposure to the sun, and the periodic cleaning of the mirror surfaces. A typical positioning system may include two servomotors and two sensors in each reflector panel to facilitate positioning thereof as each follow the path of the sun. The costs involved with such a system for multiple panels can be steep. Moreover, cleaning each reflector panel can be a time consuming process with increased costs. The cleaning typically requires a vehicle with cleaning equipment and at least one operator for the task. When required to clean multiple panels, the time and financial expenses involved can negatively impact the resources of the plant. In some instances, it may cause a loss in production due to maintenance shutdown.

In light of the above, it would be a benefit in the art of solar energy usage to provide a system that can efficiently position reflector panels and clean the same. Thus, a steering and cleaning mechanism for reflector arrays solving the aforementioned problems is desired.

SUMMARY OF THE INVENTION

The steering and cleaning mechanism for reflector arrays includes at least one fixed rail and a movable rail slidably movable along the at least one fixed rail. The at least one fixed rail is disposed adjacent a plurality of reflectors arranged in an array. A positioning/cleaning carriage is disposed on the movable rail and slidably movable thereon. The positioning/cleaning carriage includes a positioning module and a cleaning module. The positioning/cleaning carriage is positioned over a selected reflector by the combined movement of the movable rail and the carriage along the movable rail. Once positioned, the positioning module and the cleaning module are selectively actuated to both orient the target reflector in the desired position and to clean the same.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
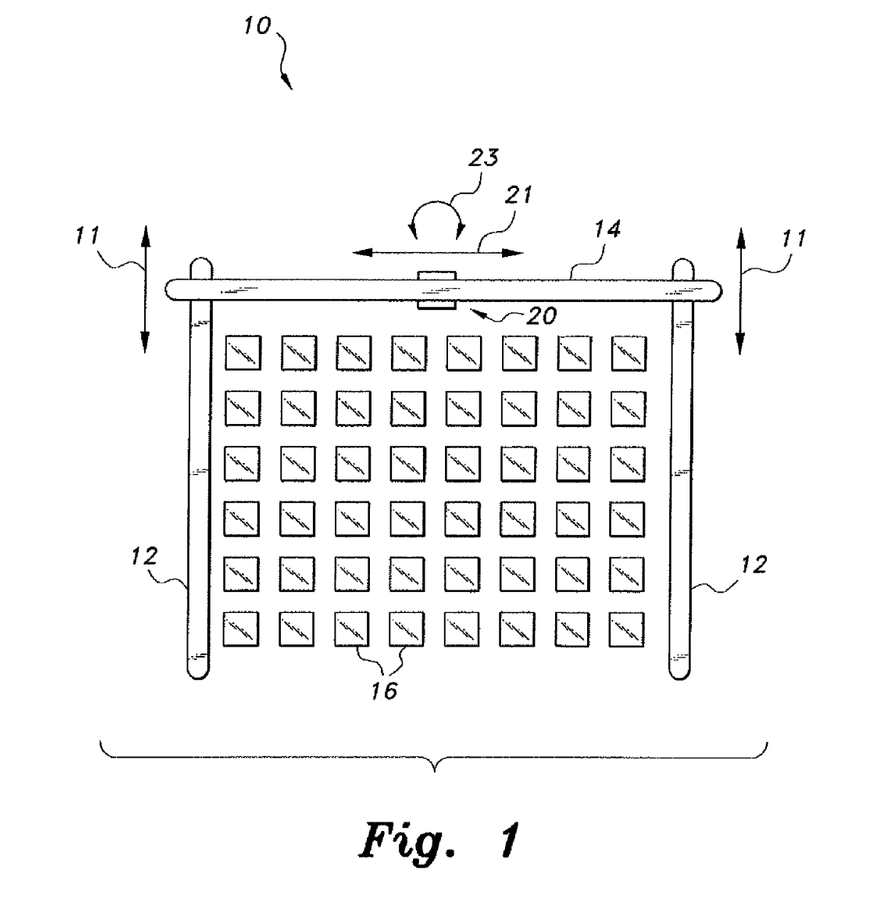
FIG. 1 is a schematic diagram of a steering and cleaning mechanism for reflector arrays according to the present invention.

The steering and cleaning mechanism for reflector arrays, a first embodiment of which is generally referred to by the reference number 10 in FIG. 1, provides automatic positioning of each reflector panel in an array, and an integrated cleaning means for periodic cleaning of the reflector panel. Initially, it is noted that the term "reflector", as used herein, refers to any panel that has reflective properties. In the embodiment shown in FIG. 1, the steering and cleaning mechanism 10 includes a pair of elongate, fixed rails 12 disposed on opposite sides of an array of reflector panels 16. A movable or sweeping rail 14 extends orthogonal to the fixed rails 12 and is movable thereon, as indicated by the arrows 11. The movable rail 14 supports a positioning/cleaning carriage 20.

As shown in FIG. 1 which shows a typical grid-like pattern of reflectors or reflector panels 16, the movable rail 14 slides along the fixed rails 12 to position the positioning/cleaning carriage 20 over or above a select row (or column) of reflectors 16. The positioning/cleaning carriage 20, in turn, is slidable along the movable rail 14, as indicated by arrows 21, to be positioned over an individual reflector 16 in order to facilitate steering and cleaning thereof. The movable rail 14 can translate along the rails 12 by any conventional means, such as motor, belts drives, rack and pinion, etc. Similar means can be incorporated to move the positioning/cleaning carriage 20 along the rail 14.

Figure 2:
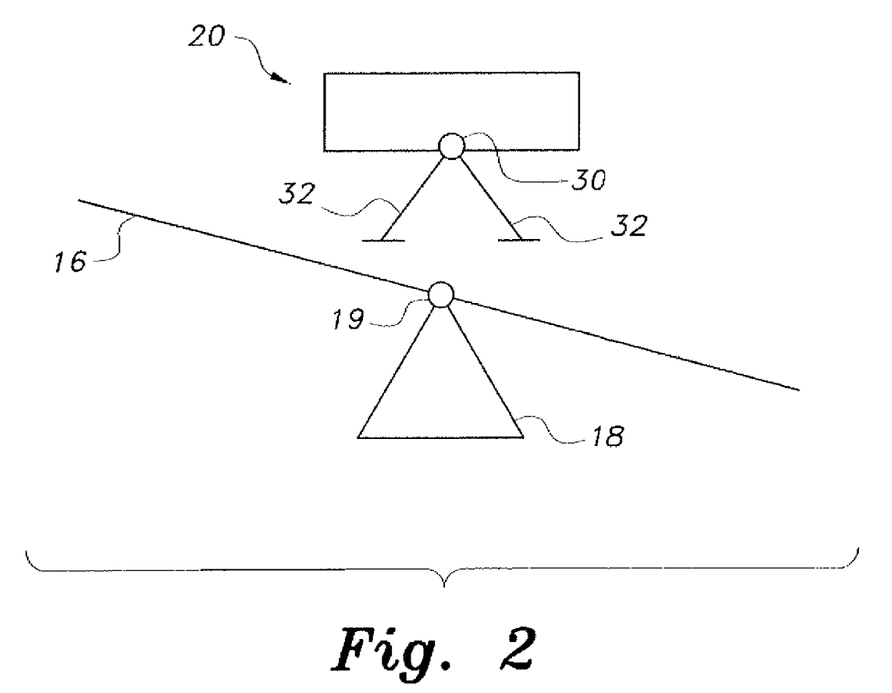
FIG. 2 is a schematic diagram of a positioning/cleaning carriage overlying an individual reflector according to the present invention.

As shown in FIG. 2, each reflector 16 is mounted on a base 18 by a joint 19. The joint 19 is preferably a ball and socket joint, which provides at least two degrees of freedom of movement, i.e., tilt in a first direction (e.g., about an X-axis) and tilt in second direction orthogonal to the first direction (e.g., about a Y-axis). The joint 19 is preferably robust to withstand, within user-defined tolerance limits, external environmental forces, such as from wind shear and inclement weather that may cause undesirable movement of the reflector 16 from a preselected position. The joint 19 can include a mechanical guide to limit movement to the two degrees of freedom of movement mentioned above and prevent mixing of the movements.

Figure 3:
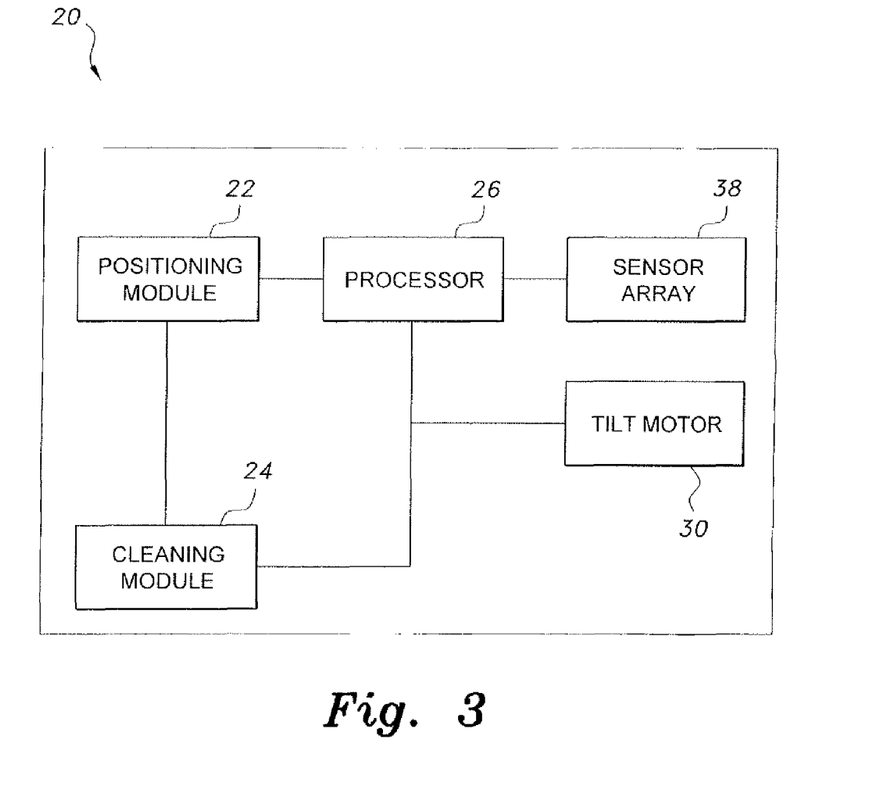
FIG. 3 is a block diagram of the components in the positioning/cleaning carriage according to the present invention.

In order to set each reflector 16 to the desired position, the positioning/cleaning carriage 20 includes a positioning module 22, as diagrammatically shown in FIG. 3. The positioning module 22 is operatively connected to a central processor 26 that controls both the steering and cleaning functions of the carriage 20. The positioning module 22 includes a sensor array 38 that senses the relative position of the carriage 20 with respect to an individual reflector 16, as well as the reflective state of the reflector 16. Based upon the sensed data, the processor 26 selectively activates a tilt motor 30 to steer, orient or position the individual reflector 16 into the desired position. The sensor array 38 can include a combination of, but is not limited to, proximity sensors, a 2D tilt meter, and an optical reflectivity sensor. As shown in FIG. 2, the tilt motor 30 includes outwardly extending tilt legs or bars 32 that can contact the surface of the reflector 16 to position the same. The contact portions or pads of the tilt legs 32 can include cushioned, resilient or soft surfaces to help prevent undesirable marring of the reflector surface. Any number of tilt motors 30 and tilt legs 32 can be used to facilitate positioning of individual reflectors 16. Alternatively, the tilt legs 32 can be configured as non-contact elements. For example, each reflector 16 and each leg 32 can be provided with magnets having the same polarity so that magnetic repulsion will force movement of the reflector 16 as the tilt legs 32 move to tilt the reflector 16 into the desired position. A more specific example of a magnetic tilt mechanism is discussed below. Another option includes the use of compressed air through the legs 32 for non-contact positioning of the reflector 16.

In use, the positioning/cleaning carriage 20 is positioned above the target reflector 16 so that the tilt legs 32 are centered with respect to the target reflector 16. Once the relative position has been determined by the central processor 26, the tilt motor 30 is activated. In order to assist accurate placement of the carriage 20, the carriage 20 can be rotatable, as indicated by the arrow 23 in FIG. 1. Moreover, the carriage 20 can be provided with short rails orthogonal to each other so that finer, horizontal positioning adjustments of the carriage 20 can be made with respect to the target reflector 16. If needed, the carriage 20 can include pneumatics, vertical rail, telescoping arm or a rack and pinion mechanism to facilitate limited vertical movement of the carriage 20 with respect to the target reflector 16.

The method of utilizing the steering and cleaning mechanism 10 described above is asynchronous, in that each mirror stays at the same orientation until the next sweep, i.e., instead of a whole row, column or grid block of reflectors 16 being adjustably positioned at once, only one or a select few reflectors 16 are so adjusted. This has been found to be a tolerable compromise because target deviation between the sun and the reflectors 16 between sweeps can be minimized by adjusting parameters, such as the: number of reflectors, speed of positioning, orientation of the reflectors 16, the number of movable rails 14, and the number of positioning/cleaning carriages 20 per movable rail 14.

As noted above, the positioning/cleaning carriage 20 also includes features for cleaning the surface of the reflector 16. The reflective properties of the reflectors 16 must be maintained at optimum levels as much as possible for efficient throughput. In most instances, infrequent, periodic cleaning should suffice, but in certain climates, such as deserts, the frequency is higher due to accumulation of environmental dust and other natural conditions. In order to minimize the equipment, human resources and space required for a separate cleaning system, the positioning/cleaning carriage 20 includes a cleaning module 24, as diagrammatically shown in FIG. 3. Several levels of cleaning can be provided by the cleaning module 24, For example, the cleaning module 24 can include a dry electrostatic cleaning mechanism and/or a dry air-blade mechanism for light cleaning, which is useful for removing errant dust. For a deeper clean, the cleaning module 24 can also include a fine mist sprayer for wet cleaning, followed by the air-blade. A soft brushing can be applied after misting for even deeper cleaning. An example of a wet sprayer is taught by International Patent No. WO 2009/061046, which is hereby incorporated by reference in its entirety. The movable rail 14 can house the air and fluid needed to supply the cleaning module 24 for air and wet cleaning, respectively, which renders the positioning/cleaning carriage 20 lightweight. In an alternative configuration, the various cleaning mechanisms can be provided in separate cleaning modules operatively attached to the movable rail 14.

In use, the optical reflectivity sensor in the sensor array 38 helps to determine the necessity and level of cleaning. When both parameters have been determined, the processor 26 activates the cleaning module 24 and proceeds to clean the target reflector 16.

As described, the dual functionality of the steering and cleaning mechanism 10 allows frequent cleaning, and even optical reflectivity evaluation. Moreover, the dual functionality eliminates the need for additional space required for cleaning vehicles. This freed space can be used for installation of additional reflectors 16, which expands capacity and throughput. In the same vein, the size and number of motors normally required to adjustably reorient the reflectors 16 in conventional systems are substantially reduced, since that would be provided in a single unit, i.e., the positioning/cleaning carriage 20. This permits reduction in conventional size of the reflectors 16, which can potentially widen the choice of sites for solar energy plants, e.g., to include small to medium size sites. Furthermore, in some instances, the conditions of the solar reflector plant do not require frequent cleaning. In those situations, the positioning/cleaning carriage 20 can be provided as a positioning only carriage, without the cleaning module 24. This results in a lighter carriage that can be used during frequent daytime operations with faster movement and reduced energy costs for moving the carriage.

Figure 4:
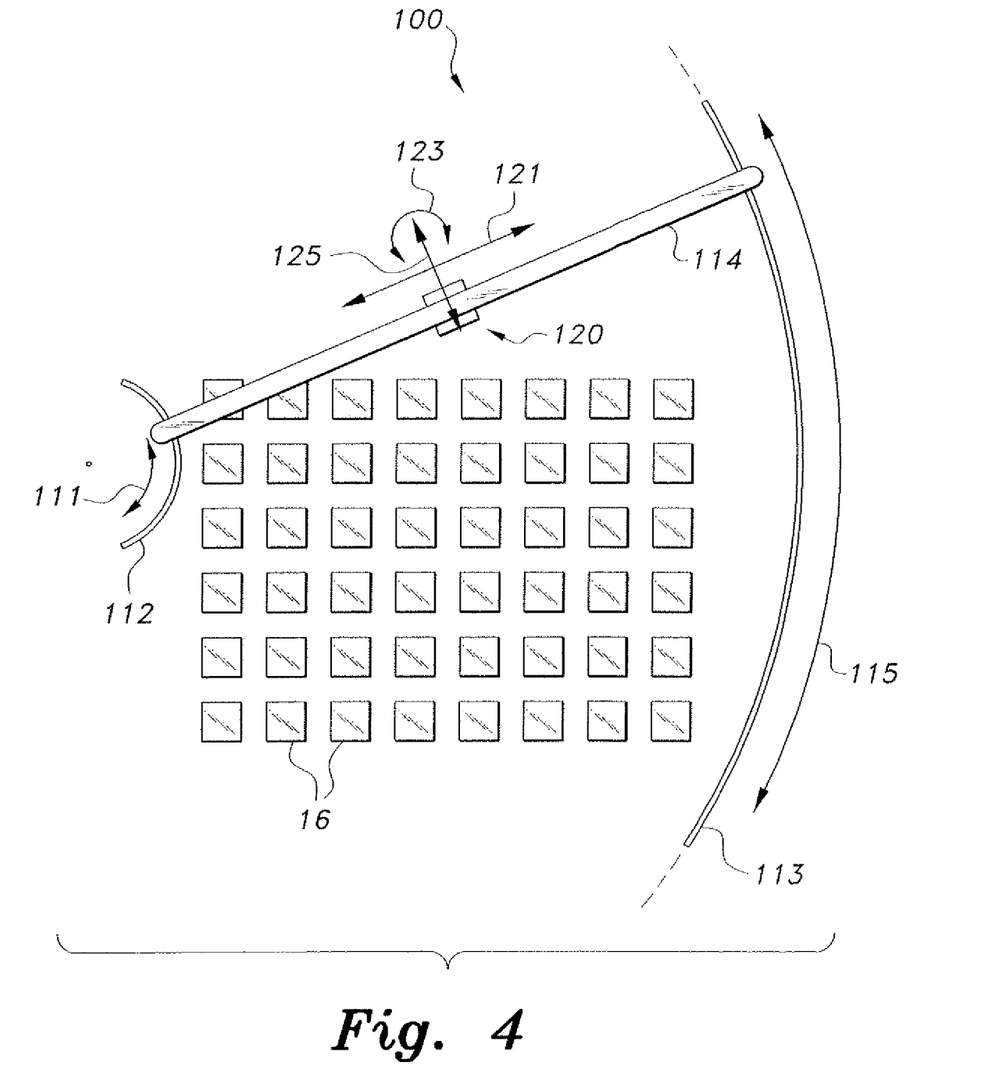
FIG. 4 is a schematic diagram of an alternative embodiment of a steering and cleaning mechanism for reflector arrays according to the present invention.

An alternative embodiment of a steering and cleaning mechanism 100 is shown in FIG. 4. In this embodiment, the steering and cleaning mechanism 100 can sweep the array of reflectors 16 in an arcuate path. As shown, the steering and cleaning mechanism 100 includes a fixed, inner arcuate rail 112 and a fixed, outer arcuate rail 113. A movable or sweeping rail 114 spans the inner and outer arcuate rails 112, 113 and moves thereon, as indicated by arrows 111 and 115. A positioning/cleaning carriage 120 is slidably connected to the movable rail 114. Besides the lateral movement of the carriage 120 along the rail 114, as indicated by arrow 121, the carriage 120 can move orthogonal thereto and rotate, as indicated by arrows 125 and 123, respectively, in order to properly position the carriage 120 over individual reflectors 16. The steering and cleaning mechanism 100 performs in a similar manner to the steering and cleaning mechanism 10 in all other respects. This configuration also allows the reflectors 16 to be arranged in a radiating manner from the inner, arcuate rail 112.

Figure 5:
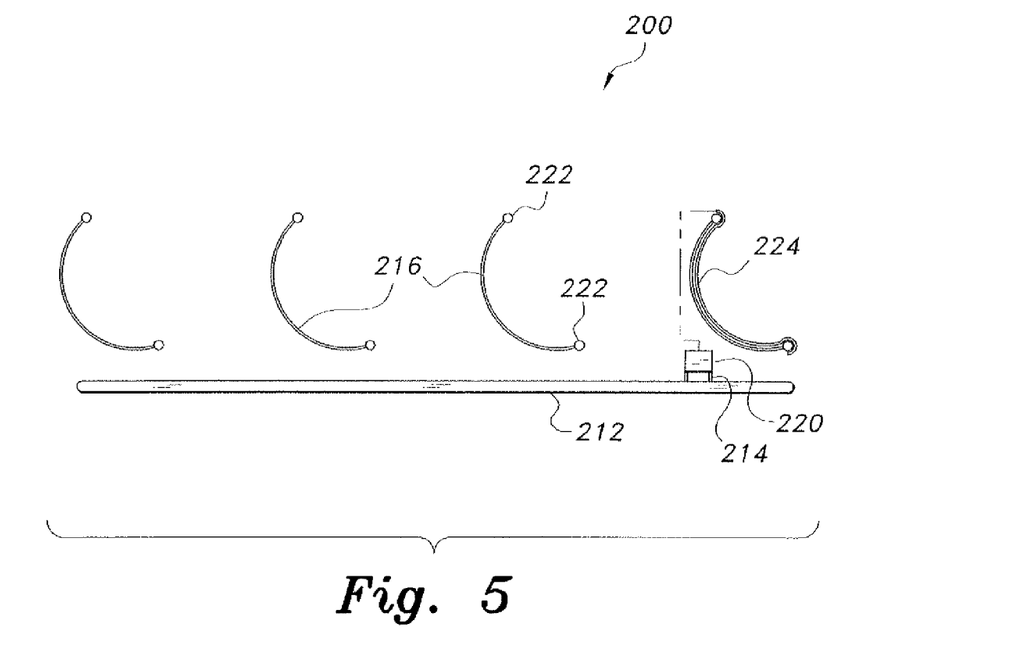
FIG. 5 is a schematic diagram of a still further embodiment of a cleaning mechanism for parabolic reflectors according to the present invention.

FIG. 5 shows an alternative arrangement for cleaning parabolic reflectors or mirrors 216 in side view. As shown, the cleaning mechanism 200 includes a fixed transfer rail 212 and a movable or sweeping rail 214 slidably movable along the transfer rail 212. A wiper transfer carriage 220 is disposed on the movable rail 214 to slidably move thereon, orthogonal to the fixed transfer rail 214. The wiper transfer carriage 220 is operatively attached to a wiper 224.

Each parabolic reflector 216 includes a pair of rails 222 disposed on top and bottom ends of the reflector 216. The wiper 224 is bent or curved to conform to the parabolic shape of the reflector 216 and includes outer, hooked bearings that ride on the rails 222. The wiper 224 is configured to provide the same type of cleaning as the cleaning module 24, and the sources for air and fluid can be housed in the wiper transfer carriage 220.

In use, the wiper transfer carriage 220 selectively positions the wiper 224 onto the rails of one of the parabolic reflectors 216. Then the carriage 220 slides along the rail 214 to simultaneously move the wiper 224 along the rails 222 and clean the surface of the target reflector 216. Once completed, the carriage 220 transfers the wiper 224 to another reflector 216 to repeat the cleaning process. As an alternative to the above, the wiper 224 can be moved independently of the wiper transfer carriage 220. Moreover, the rails 222 can serve as conductors to selectively power the cleaning process.

FIGS. 6-8B describe some of the means and methods for positioning each mirror with great accuracy and minimal contact with the reflective surface of the mirror. Automated positioning of each reflector panel requires precise positioning of the cleaning modules discussed above. To facilitate the process, some or all of the reflector panels in various array configurations can include position-identifying indicia that assist the processor 26 in determining and monitoring the relative positions.

Figure 6:
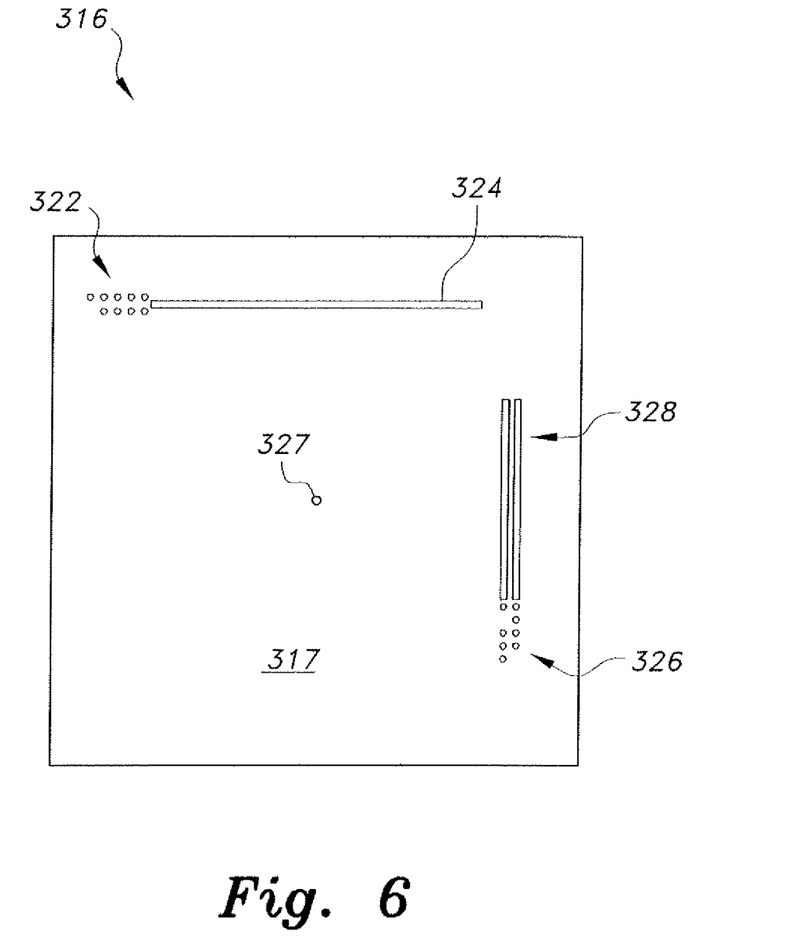
FIG. 6 is a schematic diagram of a modified reflector panel having identifying indicia for use with the steering and cleaning mechanism for reflector arrays according to the present invention.

An exemplary reflector panel 316 having identifying indicia or markings is shown in FIG. 6. In this embodiment, the reflector panel 316 can be a square or rectangular panel having a reflective mirror surface 317 when viewed from above. The various indicia shown on the surface of the reflector panel 316 are reference points that can be scanned by the sensor array 38 or the like in determining the position of the panel 316, as well as the relative position of the carriage 20, 120. These indicia or markings can be etched onto the surface or masked by other means, such as durable tape, paint, or embedded strips of non-reflective material for optical contrast with the reflective mirror surface 317. The relevant reference points can be the center indicia or marking 327, representing the center of pivot for the reflector panel 316, a combination of symbols 322 and line markers 324 (represented by, e.g., a single line) for the X-axis identification indicia or marker, and a combination of symbols 326 and line markers 328 (represented by, e.g., double lines) for the Y-axis identification indicia or marker. Both the X-axis identification marker and the Y-axis identification marker can use a pattern of symbols, such as the circles 322 and 326 shown in FIG. 6, to identify the specific location of the reflector panel 316 within the array, e.g., the second panel in the first row of a three-by-three array. Preferably, the above markings are non-reflective so that an optical scanner can easily read the markings, and the processor can calculate and compare relative positions, and adjust the orientation of the reflector panel 316 as needed. The markings can also be opaque, so long as the contrast can easily be determined. With the help of these markings, the position of the selected reflector panel can be monitored, recorded, and readjusted in subsequent passes of the positioning/cleaning carriage described herein.

Figure 7A:
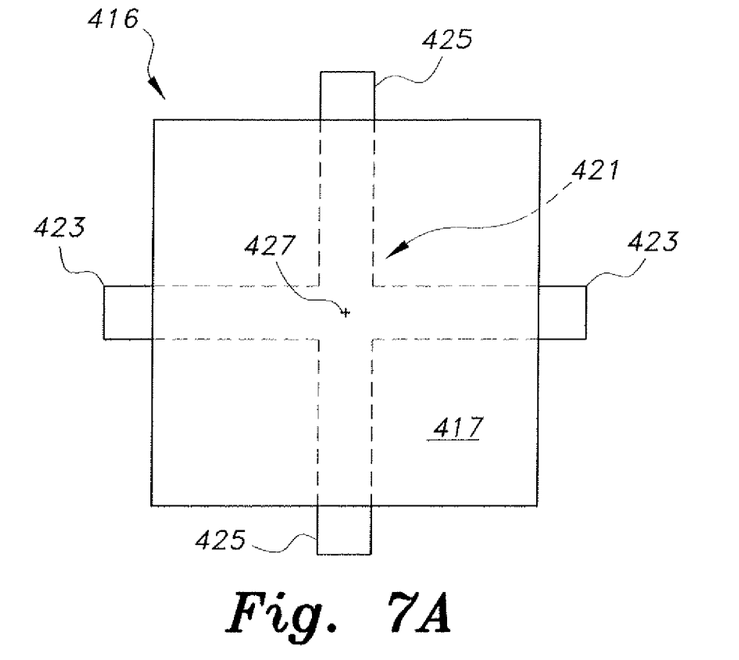
FIG. 7A is a schematic diagram of another modified reflector panel for use with a steering and cleaning mechanism for reflector arrays according to the present invention.
Figure 7B:
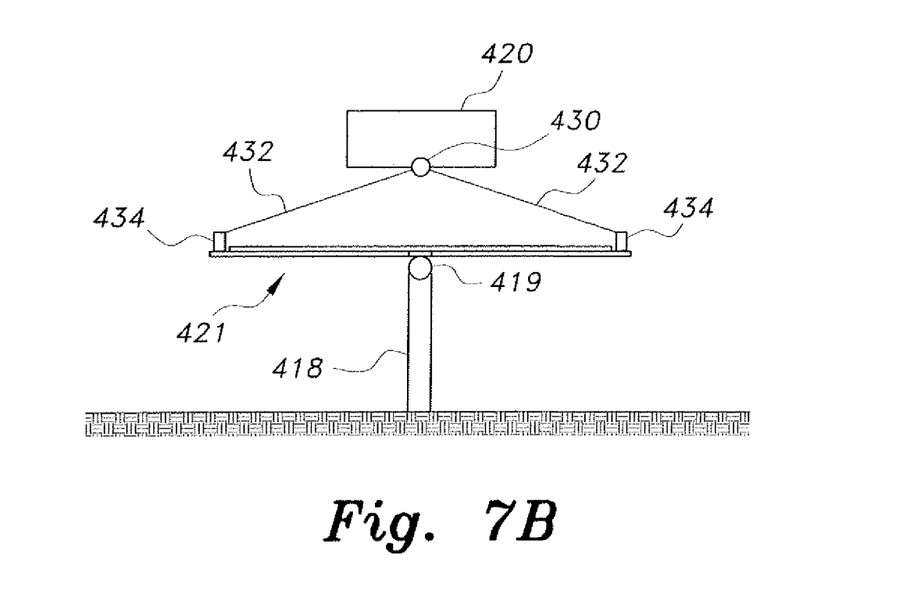
FIG. 7B is a schematic diagram of an alternative positioning/cleaning carriage overlying the reflector panel of FIG. 7A.

FIGS. 7A and 7B show one example where the orientation of a reflector panel can be facilitated with minimal or no contact with the reflective surface thereof. In this embodiment, the reflector panel 416 is mounted to a sub-frame 421. The reflector panel 416 can be of similar configuration to the previously described reflector panels 16, 316. The sub-frame 421 is pivotally mounted to a joint 419 at the end of a base 418. The reference number 427 indicates the center of pivot or rotation for the reflector panel 416. The joint 419 can be of the same construction as the previously described joint 19. The sub-frame 421 is preferably cruciform so that the ends of the orthogonal beams extend past the sides of the reflector panel 416. These extended ends form X-axis handles or contact pads 423, and Y-axis handles or contact pads 425.

In use, the positioning/cleaning carriage 420 is positioned over the reflector panel 416 with the tilt legs 432 extending towards the X-axis handles 423 and the Y-axis handles 425. Each tilt leg 432 includes a contact pad 434 at the end thereof. Upon activation of the tilt motor 430, the contact pads 434 press on the X-axis handles 423 and the Y-axis handles 425 to orient the reflector panel 416 into the desired position. The contact pads 434 can be configured the same as mentioned above with respect to the tilt legs 32. Alternatively, the contact pads 434 can be electromagnetic contact elements, and at least the handles 423, 425 can be constructed from ferromagnetic materials or magnets to facilitate mutually secure contact between contact pads 434 and the handles 423, 425 for subsequent orienting of the reflector panel 416. With the above construction, there is minimal to no contact with the reflective surface 417, which substantially reduces inadvertent marring of the reflective surface 417 that might degrade optical performance. Moreover, the sub-frame 421 and the handles 423, 425 thereof provide mechanical support during the cleaning process, especially via the mutual contact between the contact pads 434 and the handles 423, 425.

Figure 8A:
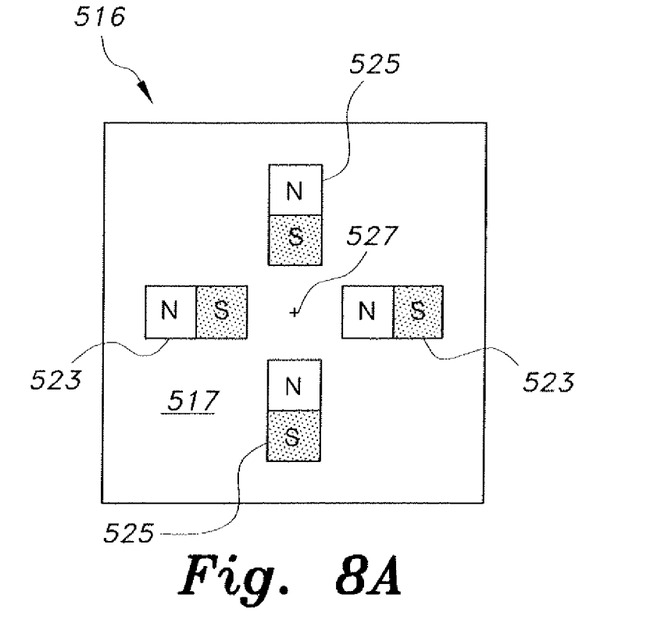
FIG. 8A is a schematic diagram showing the rear face of another modified reflector panel for use with a steering and cleaning mechanism for reflector arrays according to the present invention.
Figure 8B:
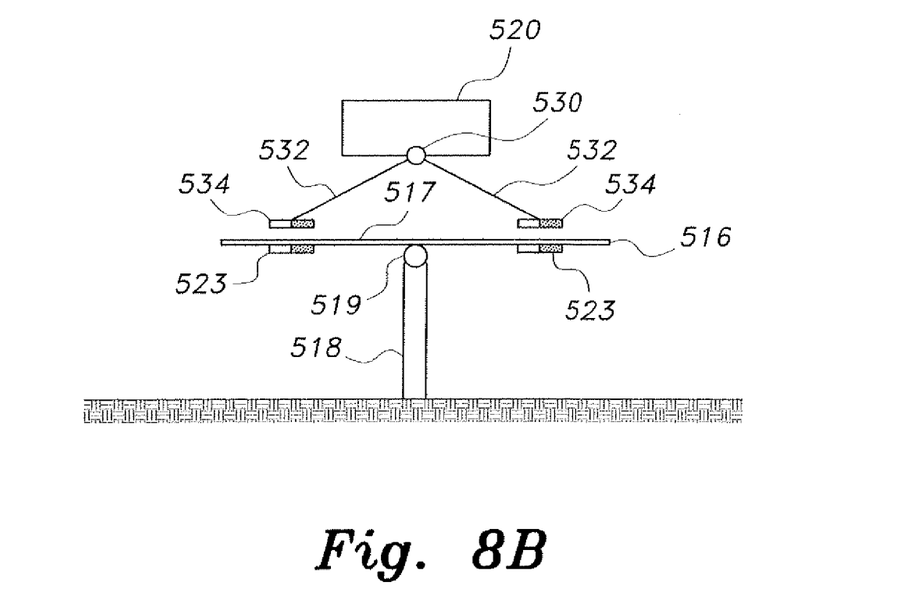
FIG. 8B is a schematic diagram of an alternative positioning/cleaning carriage overlying the reflector panel of FIG. 8A.

FIGS. 8A and 8B shows another example where the orientation of a reflector panel can be facilitated with minimal or no contact with the reflective surface thereof. In this embodiment, the reflector panel 516 includes a plurality of magnets mounted to the back of the reflective surface 517. The magnets are arranged collinearly along the X- and Y-axes, resulting in a row of X-axis magnets 523 and a column of Y-axis magnets 525.

In use, the positioning/cleaning carriage 520 is positioned over the reflector panel 516 with the tilt legs 532 extending towards the X-axis magnets 523 and the Y-axis magnets 525. Each tilt leg 532 includes a contact pad 534 at the end thereof. In this embodiment, the contact pads 534 are magnets arranged to have the same polarity as the magnet that the contact pad/magnet will be interacting with. In other words, the arrangement of the magnetic polarities of the contact pads 534, the north "N" and south "S" poles, will be the same as the arrangement of magnetic polarities, the "N" and south "S" poles, of the X-axis magnets 523 and Y-axis magnets 525, in order to induce magnetic repulsion, rather than attraction. Thus, upon activation of the tilt motor 530, the contact pads 534 press towards the X-axis magnets 523 and the Y-axis magnets 525 and force those areas to orient the reflector panel 516 into the desired position via magnetic repulsion. This prevents direct contact between the contact pads 534 and reflector panel 516 to thereby prevent potential optical degradation. The strength of the magnets can be varied, as required. In addition, the magnets can be electromagnets.

It is to be understood that the present invention is not limited to the embodiments described above, but encompasses any and all embodiments within the scope of the following claims.

I claim:

1. A steering and cleaning mechanism for reflector arrays, comprising:
    at least one fixed rail disposed adjacent a plurality of reflectors arranged in an array, each of the reflectors having a reflective surface;
    at least one sweeping rail disposed on the at least one fixed rail and slidably movable thereon;
    at least one positioning and cleaning carriage mounted to the sweeping rail, the carriage being slidably movable along the sweeping rail, the carriage having a positioning module and a cleaning module mounted thereon, said at least one positioning and cleaning carriage including a central processor for selective activation of said positioning module and said cleaning module, a sensor array for sensing at least the relative position between said at least one positioning and cleaning carriage and at least one selected reflector, and at least one tilt motor for facilitating reorientation of the at least one selected reflector;
    a base for mounting each said reflector; and
    a ball and socket joint disposed between said reflector and the base, said ball and socket joint facilitating orienting movement of each said reflector,
    wherein the at least one positioning and cleaning carriage is positioned above the at least one selected reflector by the combined movement of the sweeping rail along the at least one fixed rail and the movement of the carriage along the sweeping rail, and selective activation of the positioning module and the cleaning module, respectively, orients the modules respective to the at least one selected reflector and cleans the reflective surface thereof.

2. The steering and cleaning mechanism for reflector arrays according to claim 1, wherein said sensor array comprises proximity sensors, a 2D tilt meter, and an optical reflectivity sensor.

3. The steering and cleaning mechanism for reflector arrays according to claim 2, wherein said positioning module comprises at least one pair of tilting legs, the tilting legs being selectively movable by said at least one tilt motor to tilt said target reflector into a selected position.

4. The steering and cleaning mechanism for reflector arrays according to claim 3, wherein each said ball and socket joint further comprises a mechanical guide, the guide restricting tilting each said reflector to two directions orthogonal to each other.

5. The steering and cleaning mechanism for reflector arrays according to claim 3, wherein at least one of said reflectors comprises a plurality of identification indicia disposed on said reflective surface, the identification indicia representing axes, a center of pivot, and identity of the at least one reflector to be read by said positioning and cleaning carriage.

6. The steering and cleaning mechanism for reflector arrays according to claim 5, wherein said plurality of identification indicia are non-reflective.

7. The steering and cleaning mechanism for reflector arrays according to claim 3, further comprising a sub-frame supporting said reflector thereon, said sub-frame being pivotally mounted to said joint, said sub-frame having orthogonal, elongate beams, the beams having ends extending past sides of said reflector, the ends of said elongate beams forming handles to be acted on by said tilting legs for positioning said reflector.

8. The steering and cleaning mechanism for reflector arrays according to claim 3, further comprising:
    a plurality of magnets mounted behind said reflector, each of the magnets having magnetic polarity; and
    a contact pad disposed on each said tilting leg, the contact pad being a magnet having a polarity configured to interact the corresponding magnets on said reflector for positioning said reflector.

9. The steering and cleaning mechanism for reflector arrays according to claim 8, wherein said contact pad magnet includes has magnetic polarity the same as said corresponding magnets on said reflector to induce magnetic repulsion, said reflector being moved by said magnetic repulsion.

10. The steering and cleaning mechanism for reflector arrays according to claim 2, wherein said cleaning module comprises a dry electrostatic cleaning mechanism and a dry air-blade mechanism for light cleaning, and fine mist sprayer and a soft brush for wet deep cleaning.

11. The steering and cleaning mechanism for reflector arrays according to claim 2, wherein said cleaning module comprises a cleaning mechanism selected from the group consisting of a dry electrostatic cleaning mechanism, a dry air-blade mechanism, a fine mist sprayer and a soft brush.

12. The steering and cleaning mechanism for reflector arrays according to claim 1, wherein said at least one fixed rail comprises a pair of elongate, spaced rails, the rails being disposed on opposite sides, respectively, of said array of reflectors.

13. The steering and cleaning mechanism for reflector arrays according to claim 1, wherein said at least one fixed rail comprises an inner arcuate rail and an outer arcuate rail, the outer arcuate rail being radially distant from the inner arcuate rail, the arcuate rails being disposed on opposite sides, respectively, of said array of reflectors.

14. The steering and cleaning mechanism for reflector arrays according to claim 1, wherein said at least one positioning and cleaning carriage is rotatable and slidably movable orthogonally with respect to said sweeping rail.

15. A cleaning mechanism for parabolic reflector arrays, comprising:
    at least one fixed transfer rail disposed adjacent a plurality of parabolic reflectors arranged in a spaced array; each of the parabolic reflectors having a curved reflective surface;
    at least one sweeping rail slidably movable along the at least one transfer rail;
    at least one wiper transfer carriage disposed on the sweeping rail, the at least one wiper transfer carriage being slidably movable thereon orthogonal to the fixed transfer rail;
    a wiper operatively attached to the at least one wiper transfer carriage, the wiper having a curved shape conforming to the curved reflective surface of the parabolic reflector, the wiper transfer carriage selectively transferring the wiper from one reflector to another and moving the wiper across the reflective surface of a target parabolic reflector, the wiper having a cleaning module to clean the reflective surface as the wiper moves across the target parabolic reflector; and a pair of rails disposed on opposite ends of each parabolic reflector, the pair of rails supporting the wiper for sliding movement thereon.

16. The steering and cleaning mechanism for reflector arrays according to claim 15, wherein said cleaning module comprises a dry electrostatic cleaning mechanism and a dry air-blade mechanism for light cleaning, and a fine mist sprayer and a soft brush for wet deep cleaning.

* * * * *